United States Patent Office 2,916,474
Patented Dec. 8, 1959

2,916,474

PROCESS OF PREPARING POLYMERIC TEREPHTHALIC ESTERS BY INTERCHANGE BETWEEN A GLYCOL AND A DIALKYL ESTER OF TEREPHTHALIC ACID

Robert F. Engle, Jr., Media, Pa., assignor to E. I. du Pont de Nemours and Company, Wilmington, Del., a corporation of Delaware No Drawing. Application December 16, 1955
Serial No. 553,405

10 Claims. (Cl. 260—75)

This invention relates to an improved process for preparing polyesters, and more particularly to a process for preparing polymeric polymethylene terephthalates by an ester interchange reaction between a glycol and a dialkyl ester of terephthalic acid followed by polycondensation.

The production of the novel class of film- and fiber-forming, linear polyesters of terephthalic acid and a glycol of the series $HO(CH_2)_nOH$, where "$n$" is an integer from 2 to 10 inclusive, is fully disclosed in United States Patent No. 2,465,319 to Whinfield and Dickson. From a commercial standpoint, one of the most attractive polymers of this class is polyethylene terephthalate; and the most promising process for its production comprises carrying out an ester interchange reaction between ethylene glycol and dimethyl terephthalate to form bis-(2-hydroxyethyl) terephthalate monomer which is then polymerized to polyethylene terephthalate under reduced pressure and at an elevated temperature. For practical purposes a catalyst is required to make possible the production of these linear polyesters within a reasonable length of time, and a catalyst of high activity which can be added in quite small quantities has been sought.

It is an object of this invention to provide an improved process for preparing polyesters from glycol esters of dicarboxylic acids. Another object is to provide a catalyst which is highly effective both in promoting the ester interchange reaction between glycols and dialkyl esters of dicarboxylic acids and in promoting the polycondensation of the resulting glycol esters. A further object is to provide a catalyst which is especially effective in producing highly polymeric polyethylene terephthalate from ethylene glycol and dimethyl terephthalate.

The foregoing objects are realized by the present invention, which comprises carrying out a polycondensation reaction with a glycol ester of a dicarboxylic acid at an elevated temperature under reduced pressure in the presence of catalytic amounts of lanthanum titanate. Advantageously, according to this invention, the glycol ester of the dicarboxylic acid is prepared by carrying out an ester interchange reaction between the glycol and an alkyl ester of the dicarboxylic acid in the presence of catalytic amounts of lanthanum titanate, following which the polycondensation is carried out without additional catalytic material, or with additional lanthanum titanate, if desired. Surprisingly, although lanthanum salts and titanate salts in general have been found to exhibit only moderate catalytic activity in the polycondensation of glycol dicarboxylates, lanthanum titanate has been found to exhibit very high catalytic activity in this reaction. It is effective even when added in very small quantities.

In its broadest scope the invention is applicable to the preparation of any polyester from a glycol and a dialkyl ester of a dicarboxylic acid. Among the glycols which may be employed are the glycols of the series $HO(CH_2)_nOH$, where "$n$" is an integer within the range of 2 to 10 inclusive, such as ethylene glycol, trimethylene glycol, pentamethylene glycol, or decamethylene glycol. Polyglycols, such as polyethylene glycol having a molecular weight of from about 106 to about 6000, may also be used. Esters of any dicarboxylic acid and a saturated monohydroxy alcohol containing up to and including 4 carbon atoms may be used, specific examples being diethyl adipate, dimethyl terephthalate, dimethyl 4,4'-biphenyldicarboxylate, and diethyl sebacate. Mixtures of glycols or mixtures of esters may be employed. If desired, a minor proportion of a monocarboxylic ester, such as methyl o-benzoylbenzoate, may be present in the mixture to function as a chain terminating agent during the polycondensation reaction. Similarly, a minor proportion of a polycarboxylic ester, such as trimethyl tricarballylate, may be present to function as a cross-linking agent during the polycondensation reaction. The preferred embodiment of this invention is the preparation of bis-2-hydroxyethyl terephthalate followed by polycondensation to form polyethylene terephthalate, and the invention will hereinafter be described specifically with reference to this embodiment, using ethylene glycol and dimethyl terephthalate as starting materials.

The utility of the invention is illustrated by the experiments recorded in the table. It is to be understood, however, that these experiments are merely illustrative and any of the lower alkyl esters of the dicarboxylic acids mentioned may be substituted for the dimethyl terephthalate and used in the table. Likewise, any of the glycols herein disclosed may be substituted in like proportion for the ethylene glycol. In each experiment recorded in the table, 50 grams of dimethyl terephthalate and 50 grams of ethylene glycol were placed in a flask together with the amount of catalyst indicated in the table (percentages calculated on the basis of anhydrous compounds). The flask was fitted with a condenser and heated at atmospheric pressure, whereupon the mixture began to evolve methanol in the range 160–195° C., the temperature depending on the catalyst and its concentration. Heating was continued for about 1–2 hours, during which time methanol was evolved with continuous gentle ebullition and the pot temperature rose to about 220° C. The liquid was then introduced into a polymerization tube, and in some cases additional catalytic material was added in the indicated amounts. The mixture was heated at 275° C. under a vacuum of 0.5 to 1.2 mm. of mercury for the indicated length of time, a continuous stream of nitrogen being introduced through a capillary tube to agitate the mixture. The relative viscosity of the polymer, a measure of the degree of polymerization, was then determined by measuring in a capillary viscometer the viscosity of a solution of 11 g. of the cooled polymer in 100 cc. of a mixed solvent composed of 7 parts by weight of trichlorophenol and 10 parts by weight of phenol, and then relating the viscosity of this polymer solution to the viscosity of the mixed solvent according to the formula, $$\text{Relative viscosity} = \frac{\text{efflux time for the solution}}{\text{efflux time for the solvent}}$$

As shown in the table, lanthanum titanate (added in the form of the orthotitanate, $La_4[TiO_4]_3$) is a highly effective catalyst for the production of polyethylene terephthalate. In entries 1–3 in the table a concentration of 0.017 millimol of lanthanum titanate per mol of dimethyl terephthalate was employed as the ester interchange catalyst and additional quantities were added, as indicated, to provide the desired total quantity of catalyst for the polycondensation reaction. In entry 4 the lanthanum titanate catalyst was added in a single amount at the beginning of the ester interchange reaction, no additional catalyst being added for the polymerization reaction. As shown in entries 5–7, other lanthanum compounds have only a moderate catalytic activity in the polycondensation reaction as compared with lanthanum titanate.

As shown in entry 8 in the table, lanthanum titanate may be used to catalyze the polycondensation reaction of bis-(2-hydroxyethyl) terephthalate which has been prepared with the aid of some other catalytic material, such as calcium acetate. Entries 9 and 10 in the table illustrate the relatively moderate catalytic activity, as compared with lanthanum titanate in entry 8, of other titanate salts, such as sodium and potassium titanates (added in the form of the metatitanates, $Na_2TiO_3$ and $K_2TiO_3$). Polymer produced with the aid of lanthanum titanate was of higher viscosity than the polymer prepared with the other titanate salts despite the shorter polymerization time and lower concentration of lanthanum titanate as compared with the other titanates.

is subjected to ester interchange with a glycol followed by the polycondensation of the glycol ester at a condensation temperature, the improvement which comprises effecting the ester interchange and polycondensation with heating in the presence of catalytic amounts of a lanthanum titanate with the elimination of lower monohydric alcohol.

2. The process of claim 1 in which the titanate is lanthanum orthotitanate.

3. The process of claim 1 in which the titanate is lanthanum metatitanate.

4. The process of claim 1 in which the glycol has the formula $HO(CH_2)_nOH$ in which "$n$" is an integer having a value of 2 to 10 inclusive.

5. The process of claim 1 in which the glycol is ethylene glycol.

| Ester Interchange Catalyst | Wt. Percent Based on DMT[1] | Concentration, Mil-li-mols Per Mol of DMT | Catalyst Added After Ester Interchange | Wt. Percent Based on DMT | Concentration, Mil-limols Per Mol of DMT | Polymerization Time, Hours | Relative Viscosity |
|---|---|---|---|---|---|---|---|
| 1. Lanthanum Titanate | 0.03 | 0.017 | Lanthanum Titanate | 0.03 | 0.017 | 3 | 27.0 |
| 2. Lanthanum Titanate | 0.03 | 0.017 | ⸺do⸺ | 0.03 | 0.017 | 4 | 38.5 |
| 3. Lanthanum Titanate | 0.03 | 0.017 | ⸺do⸺ | 0.06 | 0.035 | 4 | 46.4 |
| 4. Lanthanum Titanate | 0.40 | 0.230 | | | | 4 | 52.9 |
| 5. Lanthanum Oxide | 0.03 | 0.047 | | | | 4 | 13.9 |
| 6. Lanthanum Acetate | 0.06 | 0.098 | | | | 4 | 13.0 |
| 7. Lanthanum Nitrate | 0.075 | 0.119 | | | | 4 | 13.4 |
| 8. Calcium Acetate | 0.13 | 0.423 | Lanthanum Titanate | 0.04 | 0.023 | 3 | 30.6 |
| 9. Calcium Acetate | 0.13 | 0.423 | Sodium Titanate | 0.10 | 0.363 | 4 | 21.7 |
| 10. Calcium Acetate | 0.13 | 0.423 | Potassium Titanate | 0.10 | 0.295 | 4 | 24.1 |

[1] Dimethyl Terephthalate.

Although any desired amount of lanthanum titanate may be used, concentrations of less than 0.005 wt. percent (based on dimethyl terephthalate) will usually not provide the desired reaction rate, while concentrations of more than 0.5 wt. percent are usually unnecessary. Additional catalytic materials may be added, if desired, although these will usually not be required. Other materials may also be present in the reaction mixture, such as color inhibitors and delusterants. The lanthanum titanate may be added in the form of the orthotitanate, the metatitanate, the orthodititanate, the mesodititanate, the paratrititanate, or in any other form; if desired, lanthanum titanate may be formed in the reaction mixture by the reaction of appropriate lanthanum- and titanium-containing compounds.

It will be apparent that many widely different embodiments of this invention may be made without departing from the spirit and scope thereof, and therefore it is not intended to be limited except as indicated in the appended claims.

I claim:

1. In the process of preparing fiber-forming linear condensation polyesters from glycol esters of dicarboxylic acids in which a lower alkyl ester of a dicarboxylic acid 6. The process of claim 1 in which the glycol is trimethylene glycol.

7. The process of claim 1 in which the glycol is pentamethylene glycol.

8. The process of claim 1 in which the catalyst is present in the amount of from 0.005 to 0.5% by weight based on the lower alkyl dicarboxylic acid ester.

9. The process of claim 1 in which the ester interchange reaction is between ethylene glycol and dimethyl terephthalate to form bis-(2-hydroxyethyl) terephthalate monomer.

10. The process of preparing fiber-forming linear condensation polyesters by the polycondensation of glycol esters of dicarboxylic acids which comprises effecting the said polycondensation with heating in the presence of catalytic amounts of lanthanum titanate.

References Cited in the file of this patent
UNITED STATES PATENTS 2,720,502    Caldwell ⸺⸺⸺⸺⸺⸺ Oct. 11, 1955

OTHER REFERENCES

Science Abstracts 43, A352 (Abstract #1357) (1940). (Copy in Scientific Library.)